(12) United States Patent
Russell

(10) Patent No.: US 10,139,936 B2
(45) Date of Patent: Nov. 27, 2018

(54) ERGONOMICALLY OPTIMIZED SELF-STABILIZING LEG MOUNTED MOUSE PAD WITH INTEGRATED MOUSE STORAGE HOLSTER

(71) Applicant: John Timothy Russell, Dade City, FL (US)

(72) Inventor: John Timothy Russell, Dade City, FL (US)

(*) Notice: Subject to any disclaimer, the term of this patent is extended or adjusted under 35 U.S.C. 154(b) by 0 days.

(21) Appl. No.: 15/138,212

(22) Filed: Apr. 26, 2016

(65) Prior Publication Data

US 2017/0308187 A1 Oct. 26, 2017

(51) Int. Cl.
*G06F 3/039* (2013.01)

(52) U.S. Cl.
CPC .................. *G06F 3/0395* (2013.01)

(58) Field of Classification Search
CPC .............. A47B 21/00; A47B 21/0371; A47B 2200/0066; A47B 2200/00; A47B 23/0418; A47B 2021/0385; A47B 23/041; A47B 2021/0371; A47B 2200/0095
USPC ........... 108/43, 27, 25, 50.11, 50.02, 50.01; 248/918, 118.1, 188.5
See application file for complete search history.

(56) References Cited

U.S. PATENT DOCUMENTS

| | | | | |
|---|---|---|---|---|
| 3,791,314 A | * | 2/1974 | Berretta ................. | A47B 97/02 108/43 |
| 4,422,640 A | * | 12/1983 | Tamarkin ................ | A63F 13/02 108/25 |
| 4,790,041 A | * | 12/1988 | Shtull .................... | A47D 5/00 108/43 |
| 5,339,213 A | * | 8/1994 | O'Callaghan ........ | G06F 3/03547 248/442.2 |
| 5,355,811 A | * | 10/1994 | Brewer ............... | A47B 21/0314 108/43 |
| 5,490,647 A | * | 2/1996 | Rice ....................... | G06F 3/039 248/118.1 |
| 5,593,128 A | * | 1/1997 | Odom ................... | A47B 23/002 248/346.01 |
| 5,607,091 A | * | 3/1997 | Musacchia .......... | A01M 31/004 108/43 |
| 5,687,422 A | * | 11/1997 | Wurst ................. | A63B 71/1225 108/43 |
| 5,765,790 A | * | 6/1998 | Kuldvere .............. | G06F 3/0395 108/43 |

(Continued)

*Primary Examiner* — Jose V Chen
(74) *Attorney, Agent, or Firm* — Chris Tanner, Esq.; FYPA, PLLC

(57) ABSTRACT

The ergonomically optimized self-stabilizing leg mounted mouse pad with integrated mouse storage holster provides a stable working surface area designed specifically for operating a common wireless computer mouse while resting the mouse pad discussed here on other than flat firm surfaces. Such alternative platforms upon which this device can be used effectively would include a user's thigh, the arm of a couch or an automobile's center console. The design features are purposefully engineered to ensure that the invention is self stabilizing on other than a flat firm surface through the use of a contact surface that is a curvilinear concavity with a camphered surface architecture that maximizes the advantage of the weight of the device coupled with the tacky characteristics of the material from which the device is constructed. The device is stable in its intended use without the use of supplemental attachments to secure or stabilize the device.

18 Claims, 12 Drawing Sheets

(56) References Cited

U.S. PATENT DOCUMENTS

| | | | | |
|---|---|---|---|---|
| 5,788,195 | A * | 8/1998 | Rice | G06F 3/039 |
| | | | | 248/118.5 |
| D406,578 | S * | 3/1999 | Fitzsimmons | D14/459 |
| 6,050,964 | A * | 4/2000 | Yates | B29C 44/04 |
| | | | | 248/118 |
| 6,095,058 | A * | 8/2000 | Earnhart | A47B 23/002 |
| | | | | 108/43 |
| 6,170,405 | B1 * | 1/2001 | Weitzman | A47B 3/083 |
| | | | | 108/174 |
| 6,396,478 | B1 * | 5/2002 | Kravtin | G06F 3/03543 |
| | | | | 248/118.1 |
| 6,616,108 | B1 * | 9/2003 | Brophy | G06F 3/03543 |
| | | | | 248/118.1 |
| 6,932,304 | B1 * | 8/2005 | Villamar | A47B 21/0371 |
| | | | | 248/118.1 |
| 7,963,233 | B2 * | 6/2011 | Wu | A61H 7/001 |
| | | | | 108/43 |
| 7,997,544 | B2 * | 8/2011 | Fong | G06F 3/03543 |
| | | | | 248/118.5 |
| 2004/0250738 | A1 * | 12/2004 | Conlee | B60N 3/002 |
| | | | | 108/43 |
| 2004/0261668 | A1 * | 12/2004 | Jarke | B82Y 30/00 |
| | | | | 108/43 |
| 2006/0138297 | A1 * | 6/2006 | Esimai | A47B 23/002 |
| | | | | 248/346.01 |
| 2007/0045486 | A1 * | 3/2007 | Stewart | A47B 23/002 |
| | | | | 248/118.1 |
| 2012/0060724 | A1 * | 3/2012 | Doss | G06F 1/1632 |
| | | | | 108/43 |
| 2013/0147716 | A1 * | 6/2013 | Hawker | G06F 1/1632 |
| | | | | 345/168 |

* cited by examiner

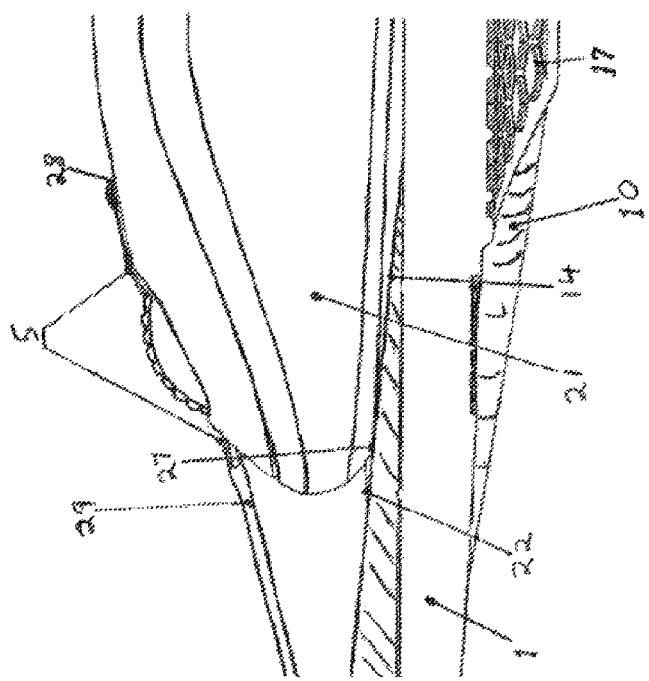

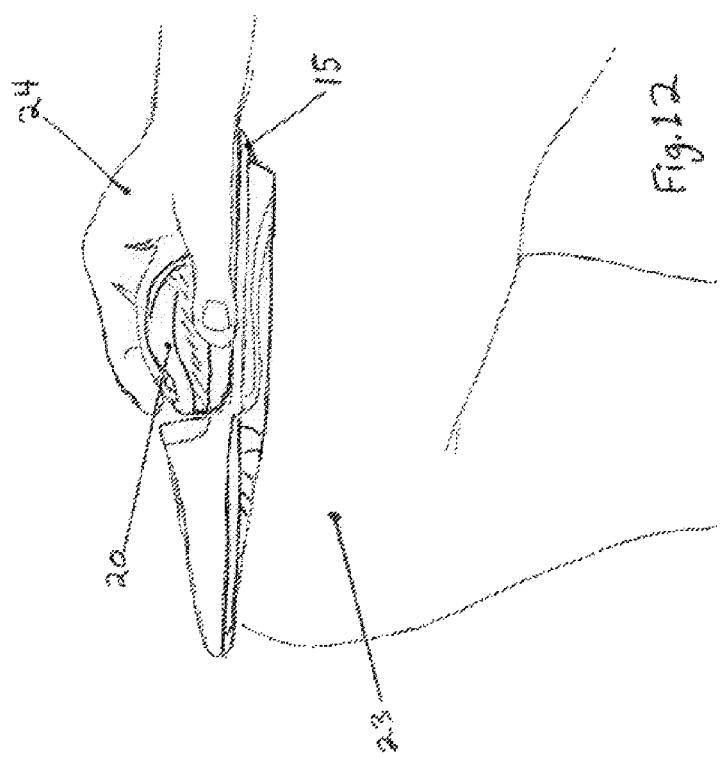

ERGONOMICALLY OPTIMIZED SELF-STABILIZING LEG MOUNTED MOUSE PAD WITH INTEGRATED MOUSE STORAGE HOLSTER

TECHNICAL FIELD

This invention concerns platforms used to operate wireless computer input devices that predominantly include wireless computer mice. Computer mice presently continue to be the dominant human computer interface being ubiquitous in their prevalence. Computer mice specifically of the wireless variety remain the standard due to universal accuracy of use by computer operators irrespective of age, physical frailty or even moderate sensory or tactile encumbrance.

While touchpads have been introduced as a substitute mostly on laptop computers, they have significant limitations for all of the uses that an operator may wish to pursue while using a computer. The problem with touchpad substitutes is that there is no buffer between the variation in tactile performance of the user of such as there is with the common wireless computer mouse. The common wireless computer mouse acts as a buffer between the variation in tactile performance of the computer operator that may be present due to age or disability. Disability for example may be present due to physical depreciation of tactile performance such as neuropathy, Parkinson's disease or other associated tremors or generalized weakness as examples.

However, I have yet to meet anyone who prefers a touch pad input device over that of a computer mouse. In fact, while the touchpad remains a poor substitute for a computer mouse input device overall, there is even wide variation among touch pads resulting in as poor performing as most are, many being much worse than others.

This invention therefor, provides a resolution of not only the touchpad alternative but others as well by permitting the use of a wireless mouse on other than flat hard substrates such as a desk top through its designed capability to be used on the user's dorsal thigh or on the arm of a couch or the center console of a car. This invention allows the use of the wireless computer mouse in an ergonomically optimized fashion when used on the dorsal aspect of the thigh rather with a conventional soft foam mouse pad on the surface of a desk.

BACKGROUND OF THE INVENTION

This invention relates to mouse pads, which in general, are a purpose designed flat, cloth covered piece of foam for use as a working surface with a computer mouse. Initially conceived in the 1980's, the computer mouse itself has evolved first from an electro-mechanical device used with one hand to actuate a curser visible on the monitor by the computer operator as the mouse is moved across the surface of the mouse pad. A computer mouse usually has one or more buttons on the top of the device, which are actuated by the user with his/her fingers, which is known as "clicking/selecting" a link, or clickable area which will trigger an action on whatever is being viewed on the monitor by the user.

The computer mouse which has from its inception, been controlled with one hand in its earliest iteration was a wired, electro mechanical device where a visible ball in an enclosure on the underside of the mouse device was actuated as the device was moved across the cloth surface of the mouse pad resulting in a predictable and consistent movement of the curser across the monitor screen.

The first generation computer mice were generally of this electromechanical design. They were connected directly to the computer by a wire thus tethering the mouse to the computer generally limiting the distance that the mouse could be effectively utilized to the fixed constraint of the wire tether which was generally 24 inches or less. Today most new computer mice utilize wireless technology known as Bluetooth™ (or other similar technology) in order to transmit the motion inputs across the surface of the mouse pad with the computer mouse to the computer screen.

The electromechanical ball apparatus on the underside of the mouse device that previously transformed movements of the mouse across the surface of the mouse pad has, over the past several years largely been replaced by an optical sensor. The optical sensor now commonly in use, much more accurately senses and transmits the motion and "click" inputs made by the computer operator across the surface of the mouse pad; Which subsequently are transmitted wirelessly through Bluetooth™ or other similar wireless signal transmission technology to the computer itself to be viewed by the operator on his/her computer monitor in real time.

The typical mouse pad is confined to use on a flat hard surface, as they are basically flexible foam mats with cloth surface imprinted with designs, graphics or logos. While the computer and its attendant mouse have evolved technologically since their inception over 30 years ago, the typical present day mouse pad has changed little since that time.

There are newer and slicker surface materials, however the pad itself still consist in general of a flat piece of foam material of varying thickness covered in cloth, or sometimes plastic-like material imprinted with graphics/logos or similar. Some higher end models may have a soft wrist support as an added feature.

Aside from this, the mouse pad itself has remained virtually unchanged since it was first brought to market more than two decades ago. The current state of the common standard mouse pad continues to be constrained to use on a flat hard surface such as a desk because they have not yet evolved from their original design concept as a matter of the context of their contemporary use.

Over the past 15 years or so there have been a variety of attempts at developing mouse pads that provided the capability of being mounted on a user's leg. Prior examples that are referenced in the citations though functional, were in general of a complicated design and accordingly, were neither intuitive or comfortable to use. These designs often included straps, sand bags or other complicated mechanisms of support rendering them unwieldy, and therefor undesirable by the average consumer.

BRIEF DESCRIPTION OF THE DRAWINGS

FIG. 11 shows a close-up partial view of an embodiment.

FIG. 12 shows an embodiment positioned on a user's thigh.

THE INVENTION

Depending on model size, as determined by differing markets and use, the preferred embodiment of the device will include a contemplated working surface area that may proportionally range in overall size from 12 to 45 square inches. See FIG. 1, 2, 3, 4, 5.

The device as contemplated here will comprise the overall design features described herein, but will include but will not be limited to that explicitly described, as there may be some slight variation in shape depending on size due to intended use, change in mouse configurations/designs and associated market demands.

Thus, the invention as contemplated in its physical embodiment as presented in this discussion therefor will likely vary proportionally in overall size as in small, medium/standard sizes as well as a larger size for the video game market. Such variation in size may require some modifications to what is the preferred embodiment of the invention due to alterations in structural requirements associated with changes in size of the device offered.

Contemplated are at least three possible model sizes that will allow the device to meet requirements that vary from the simple demands of casual internet surfing at home or office, to those of the video gamer who tends to use a much larger mouse. The typical video game mouse may be almost twice the size of an average wireless mouse with an assortment of buttons, the dedicated use of which requires a significantly larger working surface area.

Figure 2:
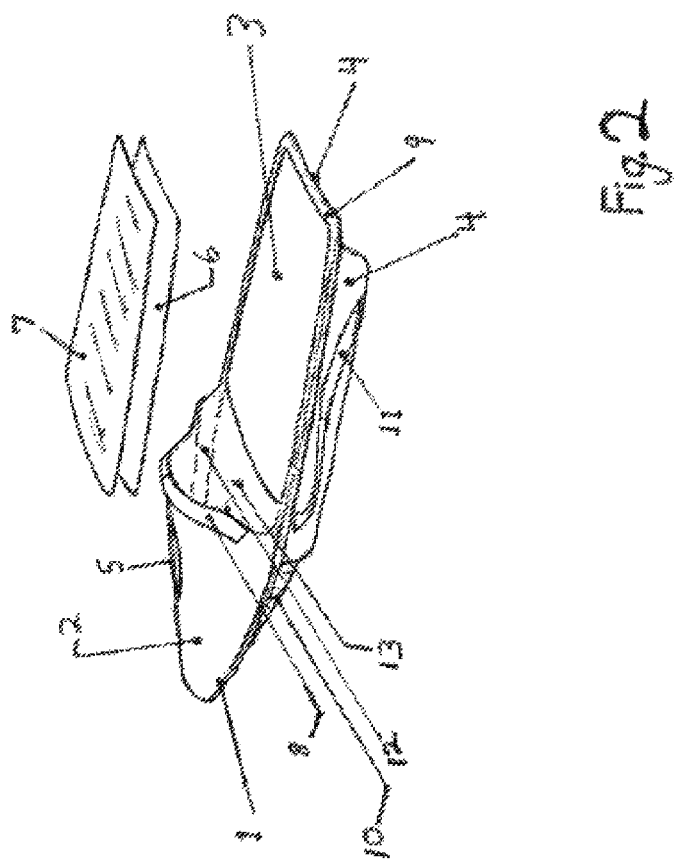
FIG. 2 shows an exploded view of an embodiment.
Figure 3:
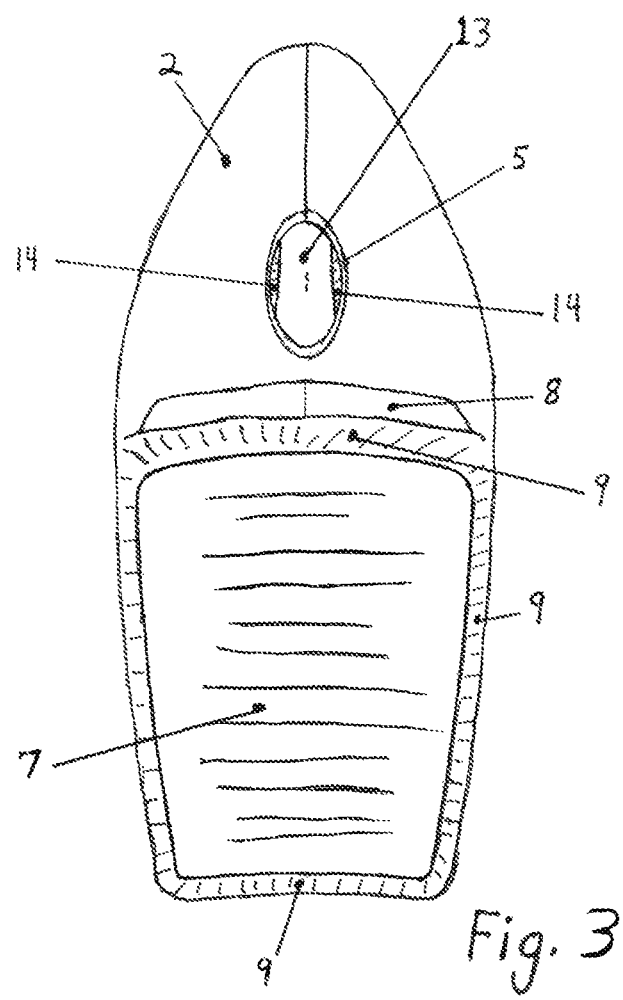
FIG. 3 shows a plan view of an embodiment.

As well, the gamer sized version will be capable of accommodating the larger wireless computer mouse with its proportionally larger integrated mouse holster for storage of the computer mouse when not in use. A larger holster may require some slight modifications related to ensuring the functional characteristics associated with its intended use. See FIG. 2, 3, 4

The casual internet surfer places much less vigorous demands as to size of a working surface, therefor making a standard size model more than sufficient for operating the typical small to medium or even slightly larger wireless computer mouse. A children's size for use with an even smaller mouse would incorporate a proportionally even smaller working surface area.

The mouse pad's working surface area dimension will therefor vary depending on specific use and market e.g., small children, standard home/office surfing size model(s) as compared to the larger working surface area model required by the demands of the video "gaming" environment. The contemplated range therefor of the working surface area depending upon use, differing markets and market segments including international will vary in size from approximately 10 to 45 square inches.

As larger monitors have become more commonplace, the conventional mouse pad itself has not evolved to accommodate the advantages provided by a larger more detailed viewing area or the fact that the mouse is no longer physically tethered to the computer by a wire. The conventional cloth covered soft foam mouse pad to this day must remain on the user's desk or other firm and flat surface in order to be utilized.

The inherent advantages of the purposefully engineered design presented here, allow it to be used on a variety of surfaces other than exclusively on a firm flat surface such as a desk. The unitary structure of this design is engineered to not only be placed for use on the top of a users thigh, but also on the arm of a couch or in an improved conventional manner on top of a desk as noted above.

Increasingly, consumers want to use their large screen televisions as monitors for their laptops. The mouse pad as presented here allows those who wish to use their large screen televisions as monitors, to do so while also making use of their computer mouse without need for a hard and flat surface upon which to place their mouse pad.

DETAILED DESCRIPTION OF THE PREFERRED EMBODIMENT OF THE INVENTION

The preferred embodiment of the mouse pad unit body itself is constructed of a molded one-piece body encompassing all of the molded features of the one-piece structure in soft plastic or like material with the preferred embodiment possessing the structural and tactile characteristics most often associated with urethane or like composite materials of approximate durometer range of 60 to 90 as a measure of material hardness with an optimal range determined to be approximately 70 to 80 durometer hardness depending on specific use, size of the device related to market demand and variation(s).

An area of recess accommodating the varying size working surface area dimensions above described, provides the designed space for placement of typical mouse pad surface finish material comprised of cloth or plastic or like material secured with appropriate adhesive. Appropriate adhesive will serve as the intervening layer between the finished working surface and the molded recessed area of the one-piece molded mouse pad unitary structure. See FIG. 2, 3, 4, 5.

The frictional characteristic of the actual finished working surface is engineered to be of a moderate degree resulting in a working surface that is easy to use, but not so slick that your mouse fails to remain in place on the pad when you leave it idle on the working surface. There are many types of finish material available from which to choose in constructing the final product. A design or logo is usually imprinted on the finish surface of a mouse pad traditionally. See FIG. 2, 3, 8.

Integrated into the design in the forward section or nose aspect of the structure is a purposefully engineered flexible pliable holster with a ramp feature on the floor beneath the area of the front nose holster area, the purpose of which is to capture and retain with adequate security, computer mice in a variety of sizes and designs typically in wide use as marketed by larger manufacturers. See FIG. 1,2 3, 4, 8.

Figure 8:
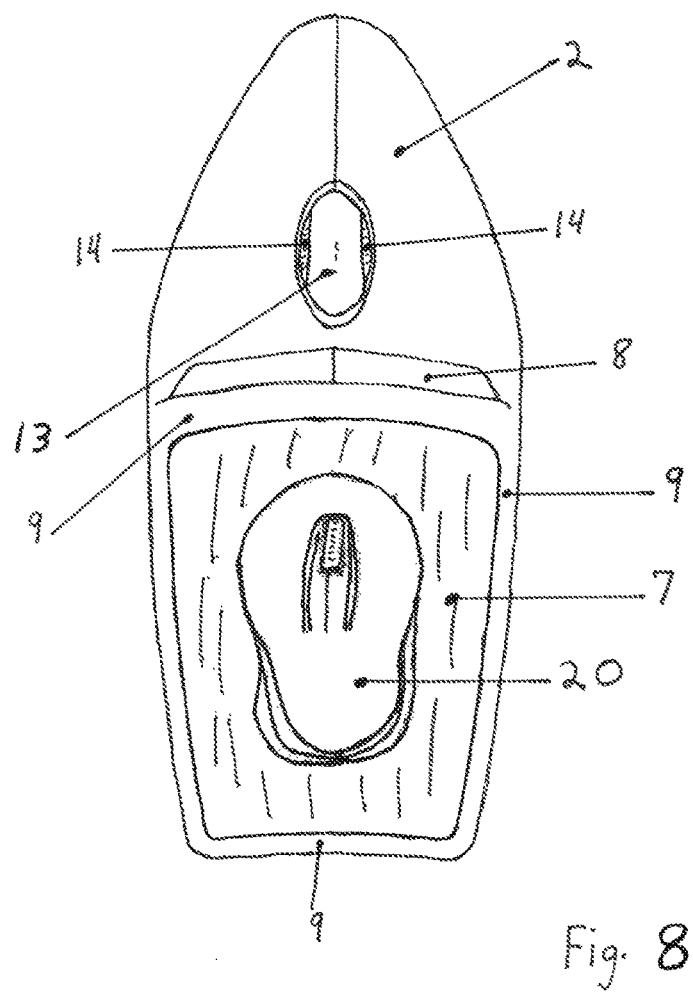
FIG. 8 shows another plan view of an embodiment, with a mouse positioned therein.

Computer mice of conventional small to moderate size, as well as the lower profile Apple Design Incorporated Magic Mouse™ are representative examples of those that will be compatible with the integrated holster mouse storage area of a standard size model. See FIG. 8

The holster area will, depending on size of the model as a consequence of use and market demands will while sharing the same overall design configuration among various model sizes, be larger or smaller dependent upon market demands and variances in designed use e.g., "gamer" models will be larger as the typical "gamer" mouse is up to double the size of a mid size wireless computer mouse.

The holster area itself is integral to the one piece molded unit as a whole, constructed of molded plastic or like material which is pliable, yet has inherently self adherent characteristics that vary with durometer hardness, and by design in a standard size model, conforming to various size computer mice of a small to medium design. See FIG. 1, 2, 4.

A children's model while maintaining the same design characteristics and structure will due to user and market variances together with use of a smaller size mouse be of a size that better accommodates a smaller size mouse.

Figure 4:
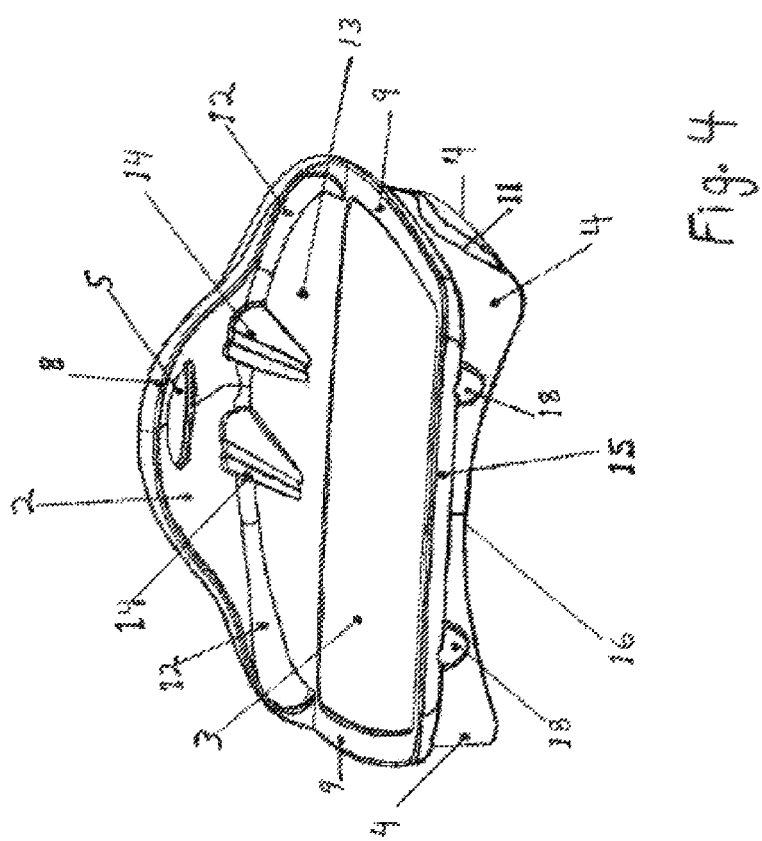
FIG. 4 shows a rear view of an embodiment.

Small to medium and somewhat larger size computer mice are accommodated for storage in a standard size model when not in use related to the pliability, conforming and adherent nature of the holster apparatus composed of urethane or like material in combination with the integrated ramp feature. See FIG. 4. The integrated ramp feature which when a mouse is inserted results in the mouse being elevated up the ramp until the top and/or side surfaces of the mouse contact either the upper wall and/or the sides of the holster thus securing the mouse in the holster. See FIG. 4, 9, 11

Figure 9:
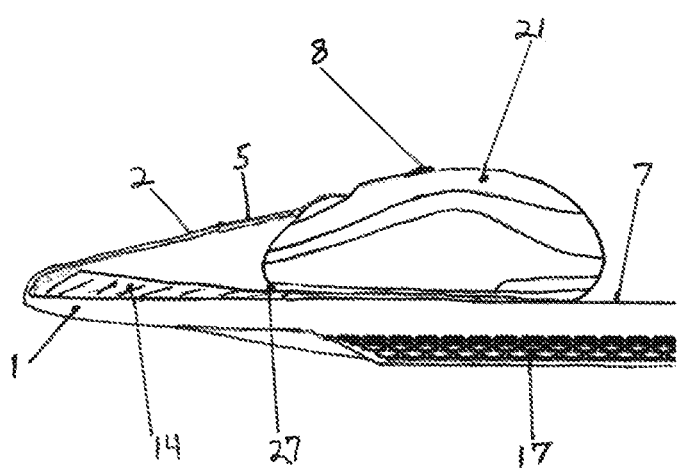
FIG. 9 shows yet another plan view of an embodiment, also with a mouse positioned therein.

This mechanism of securing the mouse in the holster results from the mouse contacting the inner roof or sides of the holster as a consequence of the mouse riding up the ramp until either the top and/or sides of the mouse contact the inner walls of the holster. The shape of the holster when not in use as seen in the diagrams provides space through deformation when a higher profile mouse is advanced into the holster and further on as it rises in response to contacting and riding up the ramp feature as the mouse enters the holster until it is adequately secured within the holster. See FIG. 9, 10, 11.

The mouse only need be advanced into the holster until it is moderately anchored within the holster. Degree of penetration into the holster will vary dependent upon actual size, design and configuration of individual mouse designs. As the mouse advances up the ramp structure, the width/height of the nose structure progressively decreases the further the mouse is inserted into the holster thus securing the mouse in the holster.

The ramp structure on the floor of the holster decreases the top to bottom spatial dimension while the narrowing side to side dimension of the nose holster wall structure serves to press the mouse into the pliable yet self adherent urethane, soft plastic or like material holster walls as the mouse itself is pushed forward into the holster. The required degree of security of the mouse within the structure of the holster is determined by the user relative to the depth of insertion of the mouse into the holster until it is secured to their satisfaction.

Figure 5:
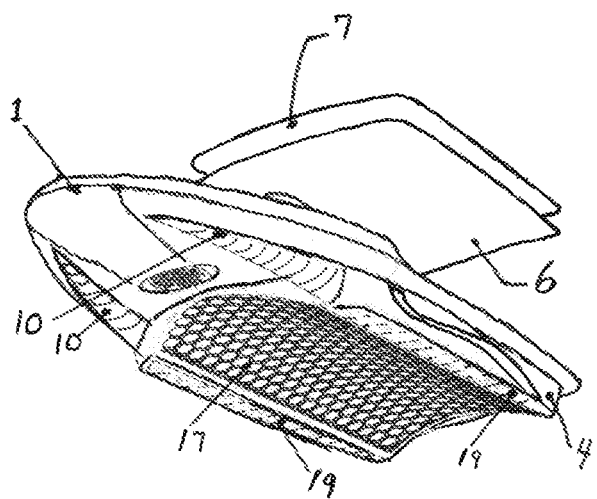
FIG. 5 shows another exploded view of an embodiment, from below.
Figure 6:
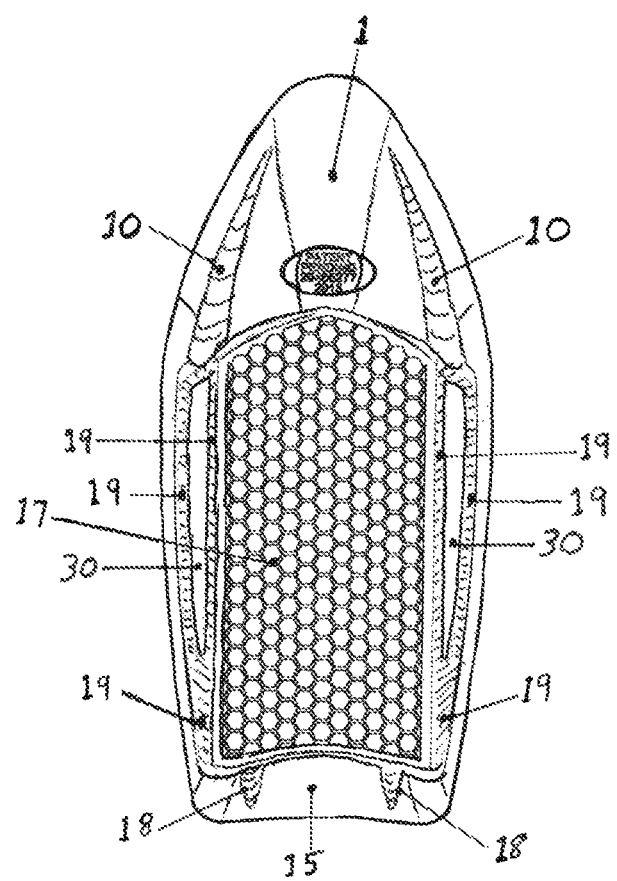
FIG. 6 shows another plan view of an embodiment.

The contact surface on the underside of the unitary structure molded of consists of combination of the integral molded camphered hexagonal design of the curvilinear concave contact surface in concert with the relatively soft and naturally adherent characteristics of urethane or like material of approximate durometer range of 60 to 90 as a measure of material hardness. See FIG. 5, 6, 7.

Figure 7:
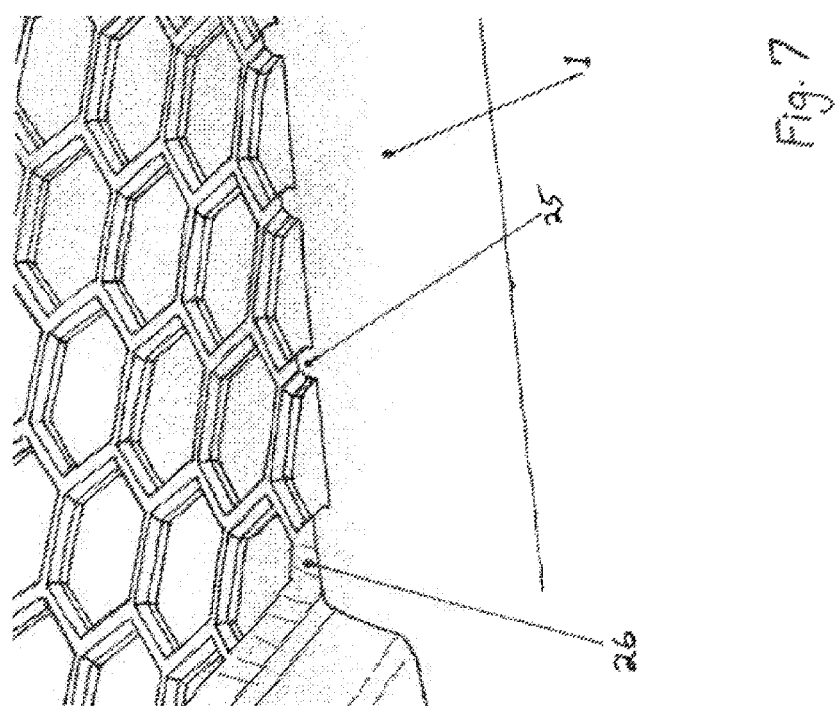
FIG. 7 shows a close-up section of a under-surface of an embodiment.

The optimal range is determined to be approximately 70 to 80 durometer hardness and with an overall weight of the complete pad structure of approximately 7 to 25 ounces depending on market and use resulting in a unitary structure that is functionally secure when in use with out supplemental securing apparatus. The camphering of the contact surface of the in this case hexagonal contact surface makes the contact surface more adherent since the point of contact because it is in fact of thinner width than its base is more pliable and consequently is more adherent to the surface upon which it is placed. This is in particular true when pressure is being imparted to the device and transmitted through to the point of contact (Camphered Hexagonal Contact Points), when a computer mouse is being manipulated upon its working surface by the user. See FIG. 7, 12.

The underside of the urethane or like material molded unit body is curvilinear and concave with a molded surface consisting of a camphered hexagonal design terminating laterally to flat bottom molded integrated leg footer structures extending the length of the concave surface from front to back of the curvilinear aspect of the device. See FIG. 4, 5, 6, 7

The degree of concavity on the underside contact surface is such that a circular diameter of approximately 3 to 12 inches, allowing the structure to rest comfortably on any diameter convex structure likely to be encountered of the range and variation of markets and uses for which this mouse pad is envisioned to be used.

This 3 to 12 inch circular diameter range with a calculated degree of concavity of a range of width of 2 to 5 inch by a range of length of 4 to 10 inch surface contact area facilitates stability on the anterior thigh of smaller size children to that of the largest adult. See FIG. 5, 6, 7, 12

These projected ranges of diameter and length are dependent on the contemplated variations in size from a children's size which would incorporate the shortest length as well as the smallest diameter and width of the curvilinear concave contact area to that of a large video gamer size model. The mouse pad is therefor from a practical standpoint, adequately self stabilizing well within its engineered functional parameters of its various intended uses in a variety of markets.

The one piece unitary structure itself is designed to provide the mouse operator with the ability to use his/her typical wireless computer mouse in an ergonomically superior manner by placing the mouse pad unit on the thigh of the user. See FIG. 12

Placing the mouse pad on the thigh enables the user to manipulate their wireless mouse in a more relaxed and anatomically less stressful and more comfortable manner on their thigh rather than in conventional fashion on top of the user's desk adjacent to their keyboard.

The integrated leg feature does allow the pad structure to be used conventionally on a hard surface such as a desk, resulting in the working surface being elevated approximately 0.75 inches above the surface upon which it is resting. See FIG. 1, 2, 4.

When the pad structure is used in the conventional location on the desk adjacent to the keyboard, the 0.75 inch elevation of the work surface above the desk will depending on the comparative relationship of the height of the desk surface and the seated height of the user, result in the mouse pad acting to preserve a more neutral position of the hand and forearm thereby helping to decrease flexion of the wrist and associated stress on the structure of the wrist itself. The moderately flexible aft area of the pad structure provides support to the hand and wrist when the pad is used conventionally on the desk as well as when mounted on the top of the thigh. See FIG. 4, 6.

Another inherent advantage rests in the narrower working surface as compared to the conventional size mouse pad. The user is promoted by the design to rest the pads of the palm of his/her hand on the flexible but supportive aft area of the pad irrespective of what position the pad is placed. Therefor, the user instinctively is prompted by the design to utilize the fingers in maneuvering the mouse across the working surface, as opposed to using the larger muscles of the forearm and even one's shoulder as more ordinarily takes place with a conventional desk top mounted foam mouse pad. An inherent ergonomic advantage can be assumed.

BRIEF DESCRIPTION OF DRAWINGS (10)

Figure 1:
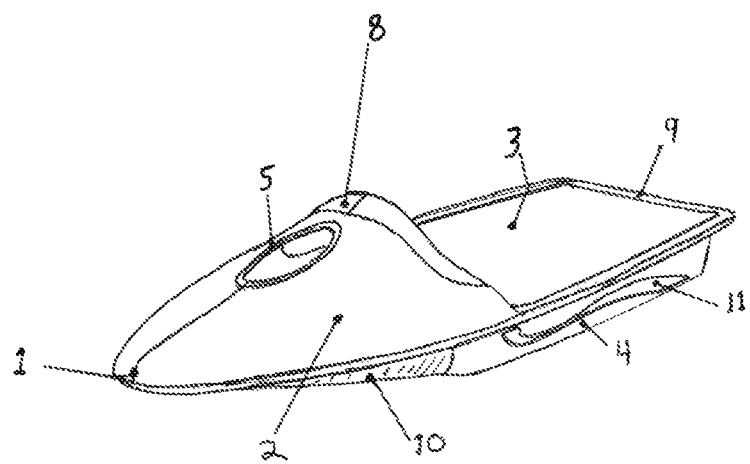
FIG. 1 shows a perspective view of an embodiment.
Figure 10:
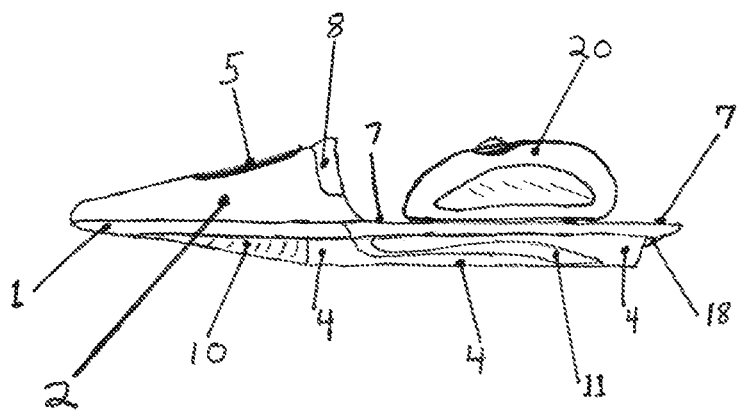
FIG. 10 shows yet another plan view of an embodiment, also with a mouse positioned therein.

The invention is described in graphic detail in one well-regarded embodiment through the attached diagrams detailed in the following. Thus FIG. 1 presents one embodiment of the invention in a top front left diagram;

FIG. 2
FIG. 3 FIG. 4
FIG. 5 FIG. 6 FIG. 7 FIG. 8 FIG. 9 presents the contemplated embodiment of the invention in a top left exploded view;

presents the invention as viewed from directly above;

presents one embodiment of the invention as viewed from the rear showing ramp feature with tangent lines shown;

presents one embodiment of the invention as viewed from below and to the right;

presents the invention as viewed from directly below revealing bottom detail features;

presents a view of the bottom camphered contact surface including cross-section of the raised surface contact structure;

presents a view of the invention from directly above with a common medium size wireless computer mouse placed on the working surface of the invention;

presents a cross-sectional cutaway view of the front mouse holster showing a common wireless computer mouse interfacing with the internal ramp apparatus at the threshold of the holster;

FIG. 10 presents a left side view of the invention diagramming a typical physical relationship of a medium size common wireless computer mouse with a standard size embodiment of the invention;

FIG. 11 presents a detailed close-up cross sectional cutaway view of a mouse (mouse not to scale) interfacing with the ramp on the floor of the holster showing only a partial cross sectional cutaway view of the holster portion of the invention;

FIG. 12 presents a diagram of the invention in a typical manner of designed use placed on the user's right leg with computer mouse operated with the user's right hand.

REFERENCE NUMBERS DETAILING SPECIFIC FEATURES OF THE INVENTION

Ref. 1 represents: One piece molded unit body of urethane or like material. Ref. 2 represents: Integral pliable conforming mouse storage holster.

Ref. 3 represents: Molded integrated recessed area for placement of working surface.

Ref. 4 represents: Molded integral leg with footer for use on flat surface.

Ref. 5 represents: Access hole with reinforced border lip for using finger to eject wireless computer mouse from holster.

Ref. 6 represents: Adhesive layer for securing final working mouse pad surface.

Ref. 7 represents: Finished imprinted working surface upon which computer mouse is operated.

Ref. 8 represents: Threshold vestibular lip support structure of mouse storage holster. Ref. 9 represents: Raised radius feature bordering working surface area. Ref. 10 represents: Integral external holster base support structure. Ref. 11 represents: Decorative design feature.

Ref 12 represents: Internal mouse storage holster base support structure.

Ref. 13 represents: Floor of mouse storage holster.

Ref. 14 represents: Ramp feature for locking mouse in place when mouse is advanced into flexible conforming mouse storage holster.

Ref. 15 represents: Aft palmar support structure.

Ref. 16 represents: Concave bottom feature.

Ref. 17 represents: Raised camphered hexagonal bottom contact feature on curvilinear base.

Ref. 18 represents: Aft reinforcing stanchion providing stiffness to aft palmar support structure.

Ref. 19 represents: Flat bottom footer feature. Ref. 20 represents: Common medium size wireless computer mouse. Ref. 21 represents: Common wireless computer mouse (Not to Scale).

Ref. 22 represents: Surface of incline ramp whereby the wireless computer mouse of various design and/or configuration will, when advanced into the holster ride up the inclined ramp(s) until secured by contact with the top and/or sides of the pliable conforming mouse holster.

Ref. 23 represents: View from left of right leg of wireless computer mouse operator engaging in typical use of invention.

Ref. 24 represents: View from left of right hand of user operating a wireless computer mouse using the invention mounted on dorsal aspect of user's right thigh.

Ref. 25 represents: Cross sectional view of camphered design feature incorporated into the hexagonal bottom contact surface configuration.

Ref. 26 represents: Inside aspect of footer allowing for use on flat surface such as that of a desk.

Ref. 27 represents: Leading edge of mouse riding up ramp incline.

Ref. 28 represents: Top of wireless computer mouse contacting top of mouse storage holster as it rides up ramp while being advanced by the user into the pliable conforming mouse storage holster.

Ref. 29 represents: Pliable mouse storage holster expands upward and outward to accommodate wireless computer mouse as it is advanced into the holster.

Ref. 30 represents: An area of shallow linear recess in the footer resulting in a divided footer.

I claim:

1. A platform, comprising:
   a molded, single piece body having a molded-in holster having a recessed storage cavity;
   a planar working surface comprising a mouse pad material suitable for operating wireless computer input devices including but not limited to a mouse;
   the planar working surface further comprising an intervening layer of adhesive;
   the mouse pad material attached to the planar working surface by the intervening layer of adhesive;
   the molded-in holster providing storage of the computer mouse when not in use;
   the molded-in holster comprising a specialized ramp located within the recessed cavity suitable for securing the mouse into the molded-in holster partly by the mouse contacting the interior of the sides and top of the molded-in holster;
   the molded-in holster comprising interior walls comprising a pliable yet self adherent urethane; and
   the planar working surface further comprising a raised finished edge.

2. The platform of claim 1, further comprising:
a molded-in concave bottom having a camphered bottom surface comprising a plurality of hexagonal shapes, each of which frictionally engages the surface of the item the platform is placed upon;
the concave bottom surface facilitating use of the platform on non-planar surfaces comprising an anterior thigh of a user, an arm of a couch, or a center console of an automobile.

3. The platform of claim 2, further comprising:
the camphered bottom surface comprising a plurality of hexagonal shapes, each shape having a contact surface and a base, where the contact surface has a thinner width than the base; and
the platform having a predetermined weight;
wherein the platform is self-stabilizing without additional securing elements such as straps.

4. The platform of claim 2, further comprising:
the camphered hexagonal bottom surface having the actual point of contact being thinner and more pliable at its base, and
the camphered hexagonal bottom surface having a soft durometry (hardness), thereby enhancing its frictional characteristics.

5. The platform of claim 2, further comprising:
the camphered bottom surface comprising a plurality of hexagonal shapes forming a point of rest of the platform onto a user's thigh or arm rest.

6. The platform of claim 1, further comprising:
a pair of integrated footers suitable for contact with flat surfaces such as a desk;
each footer bordering the length of the concave bottom at each lateral side of the platform.

7. The platform of claim 1, wherein the molded unit body is composed of urethane.

8. The platform of claim 7, further comprising:
the specific type and composition of urethane chosen to correspond with a specific durometry (hardness).

9. The platform of claim 7, wherein the molded unit body is composed of thermoplastic elastomer rather than urethane.

10. The platform of claim 1, further comprising:
the holster having contact surfaces being set at predetermined angles formed within the interior top and sides of the holster;
an angle between the interior top and interior base of the holster forming a first predetermined angle;
an angle between the interior left side and interior right side of the holster forming a second predetermined angle;
resulting in acting to secure the mouse inside the holster when not in use.

11. The platform of claim 1, further comprising:
a flexible yet supportive aft area located within the pad structure which provides support to the hand and wrist when the platform is used on a desk the same as when mounted on alternative surfaces such as a user's anterior thigh or furniture armrest.

12. The platform of claim 11, further comprising:
a working surface narrower than a conventional mouse pad, thereby facilitating a user to rest two pads of a palm of the user's hand on the aft area of the pad irrespective of what position the pad is placed whether on the user's anterior thigh or conventionally on the top of the desk.

13. The platform of claim 11, further comprising:
the aft area being of a predetermined durometry (hardness) so as to be flexible but still supportive.

14. The platform of claim 1, further comprising:
the working surface facilitating better and more ergonomic body weight-balance by facilitating increased use of fingers and decreased use of larger muscles of the arm and shoulder, to operate a mouse;
the ergonomic body weight-balance being maintained regardless of whether the mouse pad is used on a desk top, or on an anterior surface of a user's thigh.

15. The platform of claim 1, further comprising:
when located on the top of a desk, the working surface of the platform being elevated a predetermined distance such that the user encounters decreased flexion of their wrist.

16. The platform of claim 1, further comprising:
an access hole located in an upper surface of the molded-in holster.

17. The platform of claim 1, further comprising:
a pair of legs with a footer, located on a bottom rear of the platform.

18. The platform of claim 1, further comprising:
a pair of aft stanchions, located on a bottom rear of the platform.

* * * * *